3,331,203
HYDRAZINE PROPULSIVE METHOD USING LITHIUM AND AMMONIUM PERCHLORATE WITH METAL
Martin H. Kaufman, Bertram O. Stull, and James R. Sims, China Lake, Calif., assignors to the United States of America as represented by the Secretary of the Navy
No Drawing. Filed June 24, 1965, Ser. No. 467,828
1 Claim. (Cl. 60—220)

ABSTRACT OF THE DISCLOSURE

This is a novel fuel which is hypergolic with hydrazine. It consists of an aluminum skeleton having a melted oxidizer mixture composed of ammonium perchlorate or nitronium perchlorate and lithium perchlorate poured around it and cooled. The fuel is structurally substantial and has a density ranging from 1.77 to 1.98 g./cc.

---

The invention described herein may be manufactured and used by or for the Government of the United States of America for governmental purposes without the payment of any royalties thereon or therefor.

The present invention relates to an improved propellant system, and more particularly, to a solid fuel employing aluminum, or other metal, in which the metal performs both mechanical and fuel functions.

The principal problems of propellant systems are associated with obtaining uniform burning characteristics, high combustion temperatures, material compatability, and fabrication of solid grains which will burn smoothly and be structurally satisfactory. The present invention provides a solid fuel which has enhanced ignition and burning rate characteristics.

It is therefore an object of the present invention to provide a propellant system for use in missiles designed to have high boost velocity.

Another object is to provide a propellant system which has high specific impulse for use in a missile system which needs high thrust during the late stages of flight.

Still another object is to provide a novel solid grain which will contribute toward an improved hybrid rocket engine.

A further object is to provide a propellant grain which is simple, easy and safe to manufacture and handle.

Other objects, features, and many of the attendant advantages of this invention will become readily appreciated as the same become better understood by reference to the following detailed description:

In accordance with the present invention a solid fuel was prepared consisting essentially of an aluminum reinforcement supporting a fusible oxidizer mixture or eutectic consisting of ammonium perchlorate and lithium perchlorate or nitronium perchlorate and lithium perchlorate. By using an energetic metallic skeleton, the common types of polymeric binders were eliminated. Aluminum in the form of screen was either rolled into the shape of a grain and placed in a rocket motor tube or stacked therein. The oxidizer mixture was melted and poured into the motor around the skeleton or reinforcement, then cooled below its melting point for resolidification. The grain thus formed is structurally substantial, and the density ranges from 1.77 to 1.98 g./cc. The theoretical specific impulse is over 260 lb.-sec./lb. It was found that nitronium perchlorate is hypergolic with hydrazine, thereby providing a potentially useful solid fuel for use in the solid phase of a hybrid rocket system.

The following examples will better illustrate the practice of this invention, but should not be construed as defining the limits thereof.

Example I

| Ingredients: | Percent by weight |
|---|---|
| Ammonium perchlorate | 10–30 |
| Lithium perchlorate | 20–40 |
| Aluminum | 20–40 |

The aluminum in the form of wire mesh was stacked in a propellant casing or tube. The ammonium perchlorate and lithium perchlorate were melted together and the molten mass was forced into the aluminum skeleton or reinforcement, then cooled below its melting point for resolidification. Approximately 100 pressure bomb and 40 motor firings were made. The solid fuel burned satisfactorily in pressure bombs. Strand burning tests indicated pressure exponents much greater than unity for this basic formulation. It was found that this solid fuel was not hypergolic with hydrazine. Some of the motors were hybrid systems using this formulation in the solid phase and hydrazine as the injectant with an auxiliary igniter in a ratio of about 75 parts liquid hydrazine to 25 parts solid fuel. The feasibility of this unique system was thus established. Additional experiments will be necessary to establish requirements for optimization. The aluminum screen in close proximity to oxidizer apparently burns in a satisfactory manner as little or no residue was discovered in the motor tubes after firing. Theoretical information of such a hybrid system is presented as follows:

Optimum specific impulse _____ lb.-sec./lb__ 271
Optimum density _____ g./cc__ 1.98

Example II

| Ingredients: | Percent by weight |
|---|---|
| Lithium perchlorate | 25 |
| Nitronium perchlorate | 40 |
| Aluminum | 35 |

The aluminum in the form of a wire mesh formed the reinforcement. The wire was rolled to the proper diameter to form a grain skeleton and positioned in a rocket casing. The nitronium perchlorate and lithium perchlorate were melted together and poured into the motor around the wire, then allowed to cool and solidify. Many oxidizers at high temperatures will decompose. Nitronium perchlorate is one which decomposes at approximately 45° C., but mixed with lithium perchlorate, the mixture melts in the range of 118–120° C. The solid fuel was successfully ignited and burned. It was found to be hypergolic with hydrazine, hence has potential for use in the solid phase of a hybrid rocket system. Several solid fuel grains reinforced with aluminum screen were fabricated with the eutectic mixture disclosed above. They ignited and burned successfully. Theoretical information on a hybrid motor system wherein this formulation forms the solid phase and hydrazine forms the injectant or liquid phase is as follows:

Chamber temperature, ° F. _____ 7106
Specific impulse _____ lb.-sec./lb__ 282
Density _____ g./cc__ 1.77
Boost velocity _____ percent__ 93.3

The metal screen such as aluminum used in accordance with this invention, performs both mechanical and fuel functions. In other words, it serves both as a reinforcement and a combustible material. Other metals which may be used include titanium, zirconium and beryllium. Beryllium would increase the impulse, but there would be a decrease in density. If zirconium wire were used the impulse would go down and the density would go up.

These metals may also be used in combination to change the burning rate of the system.

The ratio of lithium perchlorate to ammonium perchlorate is critical. No more than 40 percent by weight ammonium perchlorate can be used because it decomposes so readily when heated. Another oxidizer which may be used to form a molten eutectic with ammonium perchlorate is hydroxylammonium perchlorate.

Hydrazine is hypergolic with the solid fuels described herein and is an excellent injectant for a hybrid motor system. However, its low density is a drawback in boost application. By increasing or decreasing the liquid to solid ratio of the hybrid system it is possible to either increase or decrease the specific impulse with a corresponding change in density.

Obviously many modifications and variations of the present invention are possible in the light of the above teachings. It is therefore to be understood that within the scope of the claim the invention may be practiced otherwise than as specifically described.

What is claimed is:

The method of developing thrust which comprises ejecting from a rocket combustion chamber the gaseous products produced by combustion of a solid fuel comprising from 10–30 percent by weight ammonium perchlorate, from 20–40 percent by weight lithium perchlorate and from 20–40 percent by weight aluminum, comprising injecting hydrazine into said combustion chamber in a ratio of 75 parts hydrazine to 25 parts solid fuel.

References Cited
UNITED STATES PATENTS

| | | | |
|---|---|---|---|
| 3,106,497 | 10/1963 | Weil | 149—17 |
| 3,163,113 | 12/1964 | Davis et al. | 102—98 |
| 3,183,665 | 5/1965 | Webb | 102—98 |
| 3,191,535 | 6/1965 | Mulloy | 149—42 X |
| 3,203,171 | 8/1965 | Burke et al. | 149—42 X |

BENJAMIN R. PADGETT, *Primary Examiner.*